(12) United States Patent
Von Der Lühe et al.

(10) Patent No.: US 7,865,073 B2
(45) Date of Patent: Jan. 4, 2011

(54) HEATING MODULE COMPRISING A HEATING SURFACE, FLOW HEATER, AND METHOD FOR THE PRODUCTION THEREOF

(75) Inventors: Friedrich Von Der Lühe, Discovery Bay (HK); William Muirhead, Chaiwan (HK)

(73) Assignee: DBK David + Baader GmbH, Kandel/Pfalz (DE)

( * ) Notice: Subject to any disclaimer, the term of this patent is extended or adjusted under 35 U.S.C. 154(b) by 805 days.

(21) Appl. No.: 10/578,307

(22) PCT Filed: Oct. 15, 2004

(86) PCT No.: PCT/EP2004/011664

§ 371 (c)(1),
(2), (4) Date: Jul. 23, 2007

(87) PCT Pub. No.: WO2005/046410

PCT Pub. Date: May 26, 2005

(65) Prior Publication Data

US 2008/0037969 A1  Feb. 14, 2008

(30) Foreign Application Priority Data

Nov. 5, 2003 (EP) .................................. 03025226

(51) Int. Cl.
  *F24H 1/10*  (2006.01)
  *A47J 31/00* (2006.01)

(52) U.S. Cl. ....................................... 392/480; 99/279

(58) Field of Classification Search ......... 392/304–487; 99/279, 280–323.3; 222/146.1–146.6
See application file for complete search history.

(56) References Cited

U.S. PATENT DOCUMENTS

| 4,343,988 | A | * | 8/1982 | Roller et al. ................. 392/467 |
| 4,870,249 | A | * | 9/1989 | Kayanuma et al. .......... 219/206 |
| 5,724,478 | A |   | 3/1998 | Thweatt ....................... 392/484 |
| 6,442,341 | B1 |  | 8/2002 | Wu ............................. 392/479 |
| 6,817,279 | B2 | * | 11/2004 | Leung et al. .................. 99/287 |
| 7,565,065 | B2 | * | 7/2009 | Kato ............................ 392/311 |
| 2002/0185867 | A1 | * | 12/2002 | Stachowiak ................. 285/354 |
| 2004/0060451 | A1 | * | 4/2004 | Leung et al. .................. 99/287 |

FOREIGN PATENT DOCUMENTS

| DE | 25 37 769     | 3/1977  |
| DE | 28 04 784     | 8/1979  |
| DE | 28 04 818 C2  | 8/1979  |
| DE | 29 48 591 A1  | 6/1981  |
| DE | 200 20 347 U1 | 3/2001  |
| EP | 0 573 691 A1  | 12/1993 |

* cited by examiner

*Primary Examiner*—Daniel Robinson
(74) *Attorney, Agent, or Firm*—Seed IP Law Group PLLC

(57) ABSTRACT

A heating module is provided for integrating into an electrical appliance, for example in a household appliance such as a coffee machine, or in a laboratory apparatus. Said module includes at least one heating surface formed from a body, at least one heating element that comprises at least one PTC element and is fixed in the body, and a flow heater that is integrated into the heating module. The heating module is configured to be easy to mount and have a wide range of applications. In one embodiment, the body is embodied as an extruded shape having at least one tube receiving element and a tube through which a fluid flows arranged on or in the tube receiving element.

24 Claims, 6 Drawing Sheets

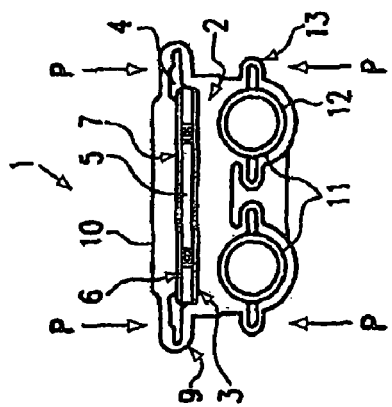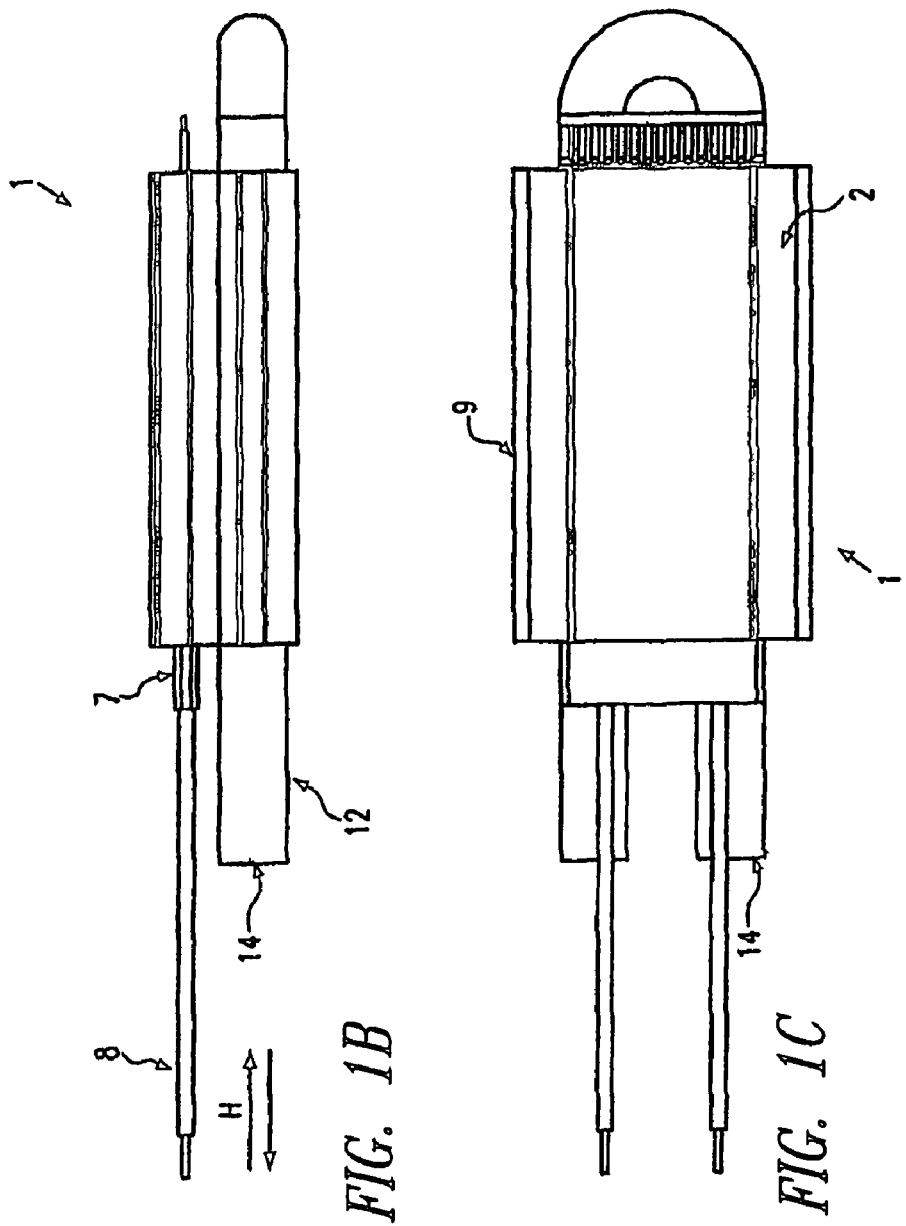

HEATING MODULE COMPRISING A HEATING SURFACE, FLOW HEATER, AND METHOD FOR THE PRODUCTION THEREOF

BACKGROUND

1. Technical Field

The present disclosure generally relates to heating devices, and more particularly, to a heating module for integrating into an electrical appliance, for example in a household appliance such as a coffee machine, or in a laboratory apparatus.

2. Description of the Related Art

Heating modules are used as heat sources in household appliances such as coffee machines or laboratory apparatuses.

In some devices from the state of the art, e.g., in DE 25 37 769 A1, a heating coil is used in order to use the heating surface to heat a cover plate with a heating function.

However, it is detrimental in the case of the device of DE 25 37 769 A1, that the heating coil requires additional power control by means of a protective thermostat, in order to prevent the heating coil from overheating. This results in increased manufacturing costs for the electrical appliance in which the heating module of DE 25 37 769 A1 is used, while simultaneously increasing its susceptibility to failure.

It is possible to do without a power control if a PTC element (Positive Temperature Coefficient) is used as the heat source of the heating module, as is the case, for example, in the heating modules of DE 28 04 818 C2 and DE 29 48 591 C2. By its material properties, the PTC element heats up only until a predefined temperature limit is reached; above the temperature limit the PTC element automatically switches off the heat production. This advantage of the PTC element is offset, however, by the fact that its attachment in the heating module requires a complex design and can be implemented only with high manufacturing expenditures. Consequently, in the heating modules of DE 28 04 818 C2 and DE 29 48 591 C2, additional mechanisms in the form of clamps and springs are provided, by means of which the PTC heating element is held against a heating body in order to achieve good heat transfer.

In order to avoid this, another way is chosen in EP 0 573 691 B1. A PTC element is pressed in an extruded shape having a heatable base plate as a heating surface. Detrimental in the heating module of EP 0 573 691 B1, however, is that, because of its restricted functionality, use in the area of household appliances and laboratory apparatuses remains restricted as compared to the devices of DE 28 04 818 C2 and DE 29 48 591 C2.

In DE 200 20 347 U1, a liquid heating tube is described in which a PTC heating element is placed in a hollow space of a heating body. In a flow hole also formed in the heating body, longitudinal ribs are arranged for good heat transfer to a liquid that flows through the flow hole, which also may result in complicated and/or expensive manufacturing.

U.S. Pat. No. 5,724,478 discloses a heating assembly with several flow conduits, in which water flowing through can be heated.

BRIEF SUMMARY

Embodiments of the present invention provide a heating module that is easy to mount, that has a wider range of application and that is easy and economical to manufacture.

According to one embodiment, a heating module includes a body formed as an extruded shape configured to be compressed or pressed together in at least a portion thereof and having at least one tube-receiving element that extends throughout the entire extruded shape, and a tube, through which a fluid can flow that is arranged so that it is approximately half unenclosed in the tube-receiving element by means of the pressed-together extruded shape.

This solution is efficient and leads to the fact that the heating module can be manufactured with a low manufacturing and assembly effort with low costs, and that said heating module is easy to mount.

In comparison to EP 0 573 691 C2, the heating module according to an embodiment of the present invention is improved to the extent that now the flow heater is integrated in the heating module in the form of the received tube.

Although other heating modules with flow heaters are known from DE 29 48 591 C2 and DE 28 04 818 C2, in the case of these heating modules, it is the case that neither is the heating element pressed nor is there provided an extruded shape with a tube-receiving element and a tube arranged on or in the tube-receiving element.

Unlike the heating module of DE 25 37 769 A1 with its inserted heating coil, it is ultimately the pressing of the heating element in the extruded shape that leads to considerably improved heat transfer.

The heating module according to embodiments of the present invention can be enhanced by various, mutually independent developments, each of which is advantageous in itself. These developments and the advantages connected to each of these developments will be briefly discussed in the following.

For example, in one embodiment, a receiving contour of the tube-receiving element can essentially correspond, at least in sections, to an outer contour of the tube. This has the advantage that the tube has good contact with the tube-receiving element, and therefore good heat transfer is guaranteed from the tube-receiving element to the tube. As a result of this development, insulating air cushions between the tube-receiving element and the tube are avoided, and the degree of efficiency of the heating module according to the invention is increased. Furthermore, the tube-receiving element can be formed as a groove into which the tube can be especially favorably inserted.

In order to transfer the thermal energy generated by the heating element to the tube as best as possible, the tube-receiving element can enclose at least half of a circumference of the tube. In this way, a large heat transfer surface from the tube-receiving element to the tube is formed, which guarantees a high level of heat emission in a direction of the tube.

In order to further enlarge the contact surface of the tube-receiving element to the tube, the tube-receiving element can be formed as a conduit that encloses the tube in its circumferential direction. Furthermore, the tube can be pressed in the conduit. This approach produces good heat transfer between the tube-receiving element and the tube, and also holds the tube in place in the tube-receiving element, making further means of attachment superfluous.

Furthermore, in one embodiment, the at least one tube-receiving element can have at least one essentially U-shaped pressing bead. The pressing bead represents a pre-weakened and preferably pre-shaped material area of the extruded shape, in which the shaping is concentrated when the tube is pressed. This has the advantage that the tube can be uniformly pressed in the tube-receiving element and, as a result, good heat transfer is guaranteed without air gaps with a heat-insulating effect. Furthermore, the pressing bead offers a good working surface for a pressing tool, e.g., pliers.

In order to increase the amount of fluid that can be heated, the heating module can have several tube-receiving elements that extend essentially parallel to one another.

In one embodiment, the tube can be connected to the tube-receiving element with a firm bond. This has the advantage that the thermal energy can be transferred to the tube directly and without an air gap. Furthermore, good attachment of the tube is provided and the tube is prevented from falling out of the tube-receiving element. The tube can, for example, be attached by gluing or soldering it in the tube-receiving element. Suitable adhesives or solders having high levels of thermal conductivity are preferred.

Furthermore, in one embodiment, the extruded shape can have a hollow space formed as a conduit, and the heating element can be pressed in the hollow space. This has the advantage that the heating element is enclosed the whole way around and without gaps, by means of which uniform pressing and good heat transfer are furthered.

In one embodiment, the heating element can be cast in the conduit-shaped hollow space formed in the extruded shape. The casting compound in this case must have good thermal conductivity. This development has the advantage that uniform thermal decoupling from the heating element to the extruded shape results, so that it is not necessary to press the heating element in the extruded shape. In addition, the casting compound can be used to compensate for material imprecisions, such as roughness or scoring on the surfaces of the conduit or the heating element, for example.

In order to simplify the manufacture of the shape, in one embodiment, the hollow spaces and/or tube-receiving elements can extend lengthwise throughout the entire extruded shape in the form of conduits.

In order to promote the fluid's uniform flow through the heating module, in another embodiment, the tube-receiving element can be formed essentially rectilinearly. Furthermore, the fluid's main direction of flow can run essentially rectilinearly through the tube. Uniform heating of the fluid is achieved as a result of the uniform flow.

For enhanced heat flow between the heating element and the medium to be heated, the extruded shape is executed from a thermally conductive material in one embodiment. In particular, the extruded shape can be manufactured from a metal, preferably aluminum. Metals and particularly aluminum are furthermore also particularly well suited for extrusion, they are corrosion-resistant and non-ageing and they have a high surface quality.

In order to make the pressing of the heating element in the receiving element easier, the extruded shape can have a pressing bead, with an essentially U-shaped cross-section, at least on one side of the receiving element. The pressing bead is an essentially U-shaped pre-weakened material area, projecting and therefore easily accessible to a pressing tool, that is plastically deformed around a predetermined gap. After the insertion of the heating element into the extruded shape, the at least one pressing bead can be pressed together during the assembly process of the heating module, by means of which the extruded shape is plastically deformed in this pre-weakened area and the receiving element is reduced in size. In this way, the heating element is pressed in the receiving element and pre-tensioned, which guarantees good heat transfer to the extruded shape and further prevents displacement of the heating element within the extruded shape.

In one embodiment, the heat emission surface of the heating element and the heating surface formed by the extruded shape can be essentially of equal size. This has the advantage that an extensive, straight-lined heat flow from the heating element to the extruded shape is achieved, and heat build-up is prevented.

In one embodiment, the at least one tube-receiving element, the at least one heating surface and the heating element can form a stack in the heating module according to the invention, in a direction essentially perpendicular to the heating surface. This is advantageous, because in this way, good heat flow is guaranteed from the heating element to the at least one tube-receiving element and the at least one heating surface. Furthermore, the extruded shape can be arranged between the at least one tube-receiving element, the heating element and the at least one heating surface, in order also to allow optimal heat flow from the heating element in both directions. In order to be able to conduct the thermal energy particularly well to the flow heater and the heating surface, the heating element can be arranged between the at least one tube-receiving element and the at least one heating surface in a further embodiment.

Additionally, in another embodiment, the at least one tube can be arranged so that it is longer than the tube-receiving element, consequently forming a means of connection for the feed line and/or offtake line of the fluid. The feed line and offtake line can be mounted on the projecting piece of the tube and attached to it.

Furthermore, in yet another embodiment, the at least one tube can be manufactured from a heat-conducting material, for example, aluminum. In this way, the thermal energy can easily be transported within the tube to the medium to be heated. Furthermore, the at least one tube can also be manufactured from a corrosion-resistant material. This is advantageous, because the liquid to be heated flows through the tube, which leads to deposits and intensifies corrosion.

In still another embodiment, the inlet side and an outlet side of the tube can be arranged on the same face side of the heating module. This has the advantage that the connection lines of the fluid lead to the heating module on only one face side, so that only this one face side of the heating module also has to be accessible for connecting the tube. Furthermore, the electrical connection lines of the heating element can also run on that face side of the heating module on which the inlet side and the outlet side of the tube are also found. In this way, the connection of the heating module can easily be made from only one side.

In one embodiment, the heating element can comprise two electrode bodies, which, together with the at least one PTC element arranged in between, form a stack. This has the advantage that good conductance of electrical current to the PTC element is guaranteed by the electrode bodies. Furthermore, each of the electrode bodies can have a contact element, by means of which the electrode bodies can be connected to a voltage source.

In another embodiment, the heating element can consist of at least one PTC element with contact lines or wires soldered on. This has the advantage that good conductance of electrical current to the PTC element is guaranteed by the soldered-on wires. Furthermore, the wires can be connected directly to the voltage source.

In order to achieve electrical insulation of the heating element from the extruded shape, the heating element can comprise at least one insulating element, which encloses the at least one PTC element and the two electrode bodies or soldered-on wires. Furthermore, the insulating element can be manufactured from a plastic foil, preferably a polyimide foil. In particular, the plastic foil can be a bag-shaped Kapton foil, which encloses the at least one PTC element and the two electrode bodies or soldered-on wires. Furthermore, the heating element can also be electrically insulated from the extruded shape by means of an intermediate layer of an insulating element. In this way, the heating element is insulated from the extruded shape in the simplest way.

In addition to the heating module described above and its developments, embodiments of the present invention can also relate to an electrical appliance, in particular, to a coffee machine or laboratory apparatus, with a liquid reservoir, a hot plate and a line. In order to reduce the assembly effort and manufacturing costs of such an electrical appliance, the electrical appliance contains a heating module in accordance with one of the above-mentioned embodiments, wherein the heating surface of the heating module is in a heat-transferring connection with the hot plate.

In order to guarantee good heat transfer from the heating module to the hot plate, the electrical appliance can, in one embodiment, comprise a spring element, by means of which the one heating surface of the heating module is pressed against the hot plate. In addition, the heating module itself can represent the heating surface of the electrical appliance and be formed in a single piece with the heating surface.

In addition to the apparatuses explained above and their further developments, other embodiments also relate to a method for the manufacture of a heating module with which liquids can be warmed and an integrated heating surface can simultaneously be heated. In order to guarantee good heat transfer between the heating element and the extruded shape, the invention calls for the method to provide an extruded shape with at least one hollow space, at least one tube-receiving element that extends throughout the entire extruded shape and at least one heating surface, for at least one heating element to be inserted into the hollow space of the extruded shape, for the heating element to be pressed or cast in the hollow space and for a tube through which a fluid can flow to be arranged so that it is approximately half unenclosed in a circumferential direction in the at least one tube-receiving element formed in a groove shape or for the tube to be pressed in the tube-receiving element by means of pressing together the extruded shape.

In order to heat the fluid more strongly, the tube can be curved in an essentially U-shaped form and the at least two side pieces of the tube bent in a U-shape can be arranged in at least two tube-receiving elements, parallel to one another, of the extruded shape.

In another embodiment, the heating element can be pre-assembled before being inserted in the extruded shape by forming a stack comprising at least one PTC element, two electrode bodies and at least one insulating element. This has the advantage that the assembly of the heating module is simplified.

In order to produce an efficiently heat-conducting connection between the tube and the tube-receiving element, the at least one tube can be connected to the at least one tube-receiving element in a firm bond.

In the following, the invention is explained by way of example, with reference to the accompanying drawings. The various characteristics can be combined independently of one another, as was already explained above in the individual advantageous developments.

BRIEF DESCRIPTION OF THE SEVERAL VIEWS OF THE DRAWING(S)

FIGS. 1A, 1B, and 1C (collectively FIG. 1) illustrate a heating module according to one embodiment, shown schematically in three views;

Figure 6:
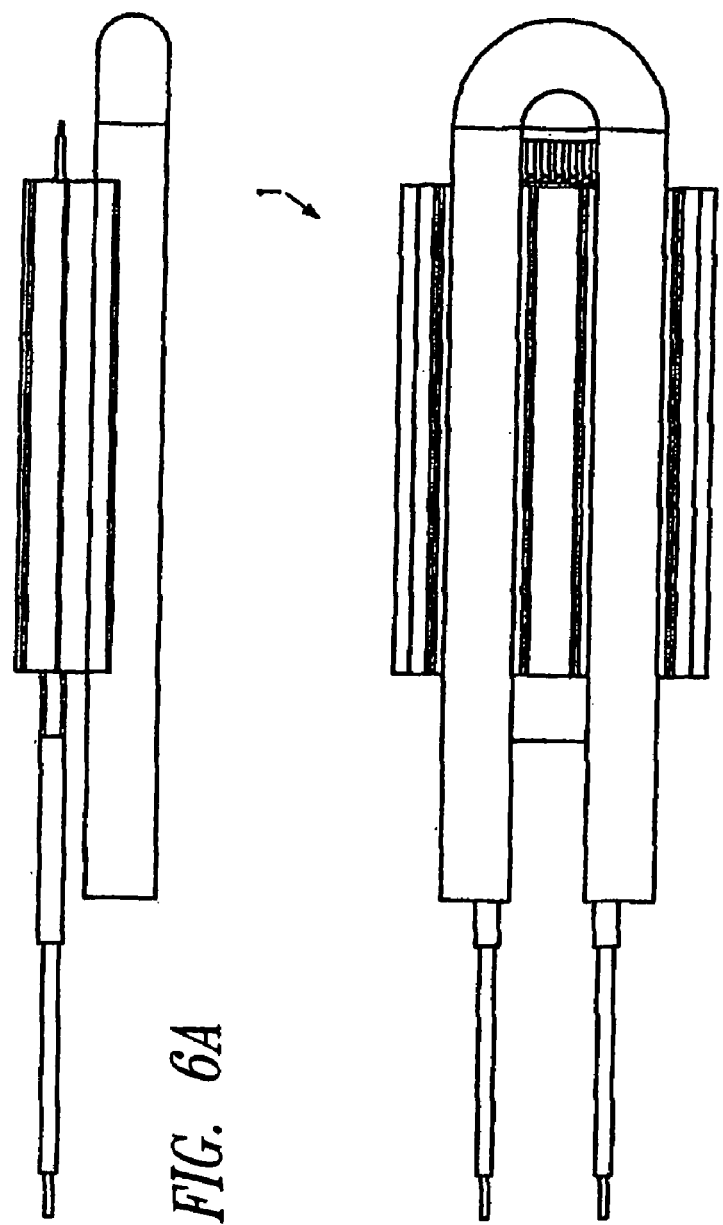
Figure 7:
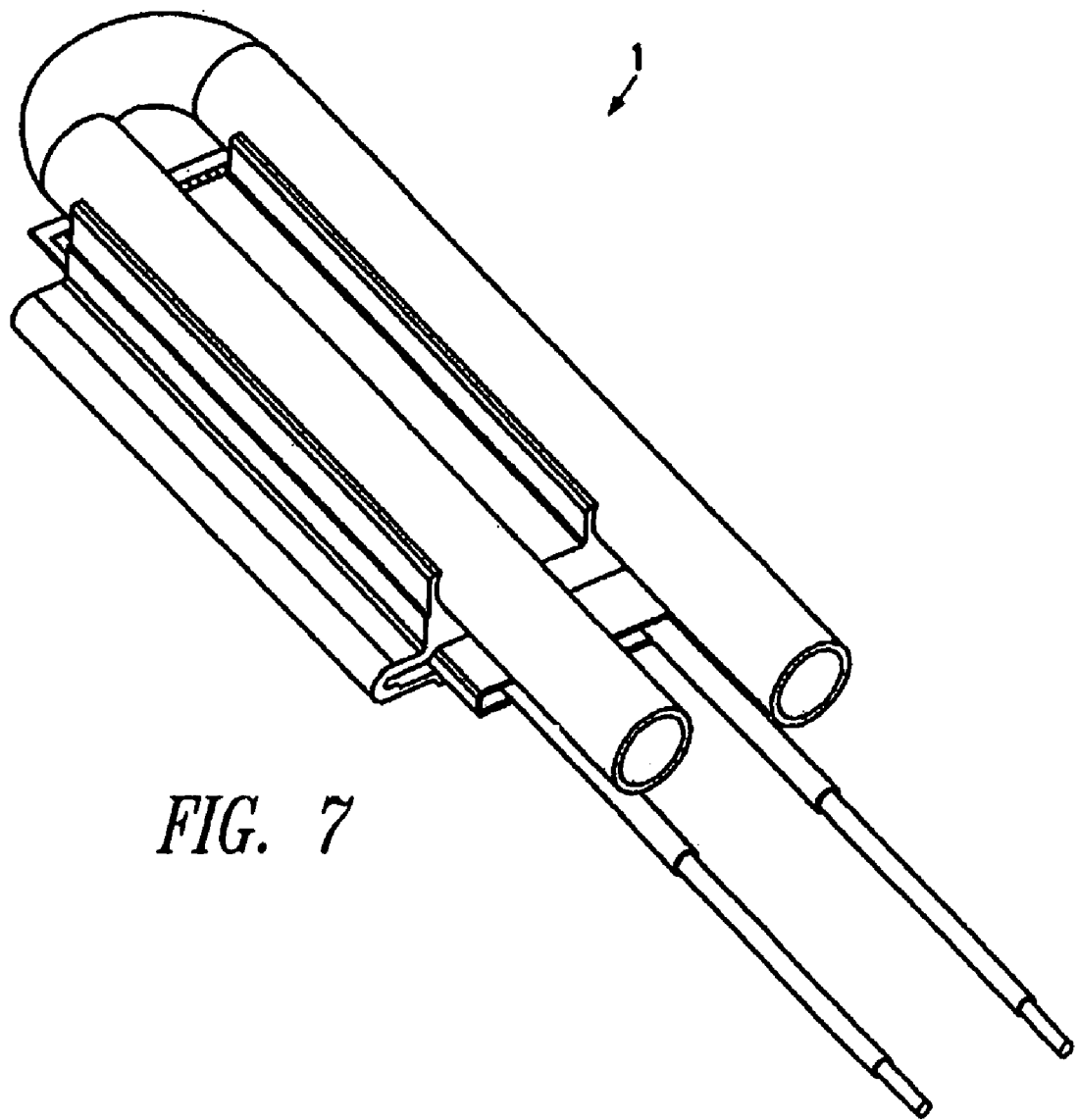

FIGS. 6A, 6B, and 6C (collectively FIG. 6) illustrate a heating module according to another embodiment, shown schematically in three views;

FIG. 7 illustrates the heating module from FIG. 6 schematically in a perspective view from above.

DETAILED DESCRIPTION

FIGS. 1 to 3, and 5 show a heating module 1 according to one embodiment, with an extruded shape 2 and a heating element 3. The extruded shape 2 forms a hollow space 4' (FIG. 5) executed as a receiving element 4, in which the heating element 3 is arranged.

In the illustrated embodiment of FIG. 1, the heating element 3 includes at least one PTC element 5, two electrode bodies 6 and an insulating element 7. The plate-shaped PTC element 5 and the electrode bodies 6 are arranged over one another. In order to conduct an electric current uniformly through the PTC element, the electrode bodies 6 have a contact surface, which is essentially just as large as a heat-emitting surface W (FIG. 5) of the PTC element 5. In one embodiment of the heating module 1 with several PTC elements 5 next to one another, the heat-emitting surface W of the several PTC elements 5 together is essentially just as large as a contact surface of the electrode bodies 6.

The sandwich-like construction of the PTC element 5 and the electrode bodies 6 is enclosed by the insulating element 7, which can be foil-like. The insulating element 7 electrically insulates the sandwich of the two electrode bodies 6 and the PTC element 5 from the extruded shape 2.

In order to guarantee good heat conduction from the PTC element 5 or electrode bodies 6 to the extruded shape 2, the insulating element 7 is manufactured from a heat-conducting material. In the case of the explanatory embodiment in FIG. 1, the insulating element 7 is manufactured of a polyimide foil, in particular, from a Kapton foil. The Kapton foil has the advantage that it is very thermally conductive, but still electrically insulating, and furthermore is pressure-proof. Because the insulating element 7 is pressure proof, a pre-tensioning force applied to the heating element 3 can be transferred to the electrode bodies 6 and the PTC element 5 without restrictions. Each of the electrode bodies 6 is connected to a voltage source (not shown) via contact elements 6' (FIG. 5) and contact lines 8. The contact elements 6' can comprise plug-and-socket connectors, e.g., a standardized plug, so that it is easily possible to attach the contact lines 8 to the contact elements 6'. A non-detachable connection of the contact lines 8 to the contact elements, e.g., by means of soldering, is likewise possible.

In another embodiment, as an alternative to the electrode bodies 6, the contact lines or wires 8 can also be soldered directly to the PTC element 5.

Figure 2:
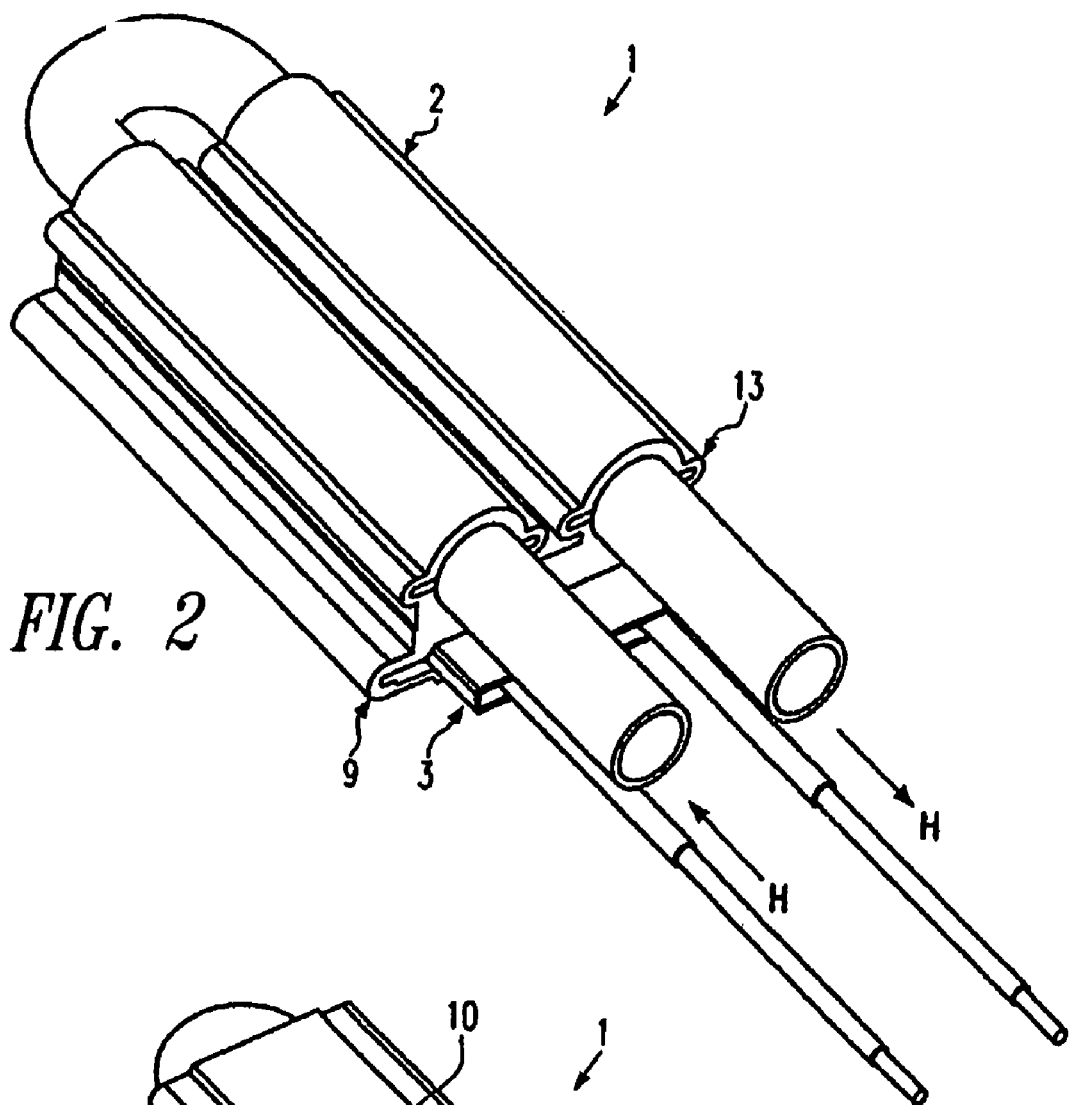
FIG. 2 illustrates the heating module from FIG. 1 schematically in a perspective view from below.
Figure 3:
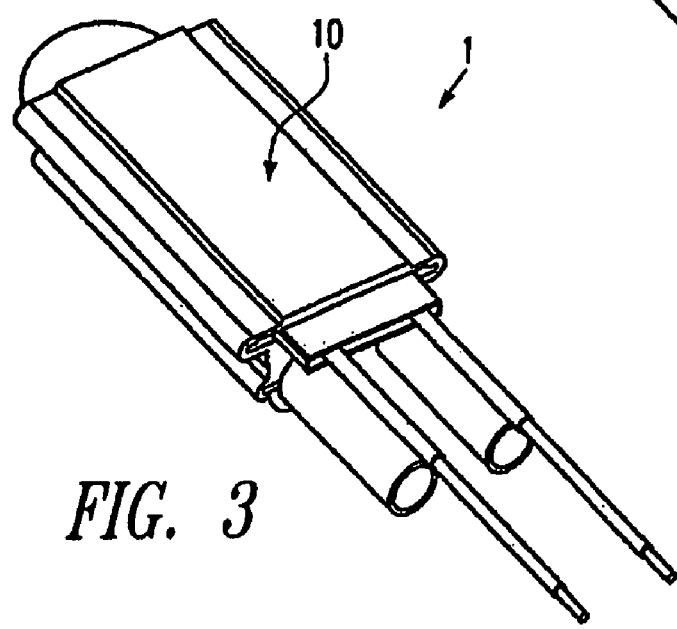
FIG. 3 illustrates the heating module from FIGS. 1 and 2 schematically in a perspective view from above.
Figure 5:
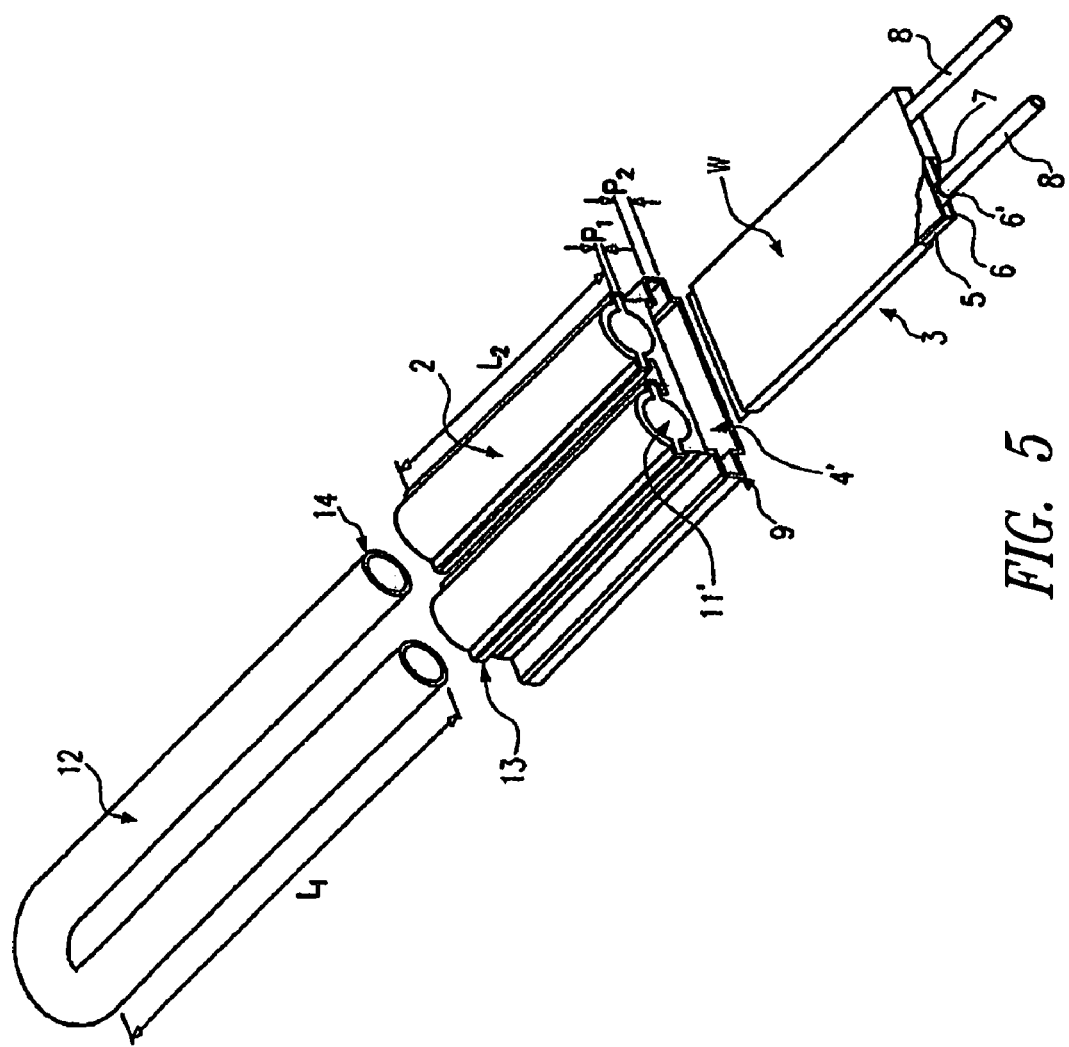
FIG. 5 illustrates a schematic exploded view of the heating module from FIGS. 1-3.

In order to achieve good heat transfer between the heating element 3 and the extruded shape 2, the heating element 3 is pressed in the extruded shape 2 in FIGS. 1 to 3. At the side of the extruded shape 2, essentially U-shaped pressing beads 9 are formed in the cross-section. The pressing beads have an inner air gap with a predetermined size $P_2$ (FIG. 5). The pressing beads can be pressed together by the size $P_2$ of the air gap. When the heating element 3 is pressed in the extruded shape 2, two opposing pressing tools (not shown), e.g., pliers, can press the pressing beads 9 together in a pressing direction P (FIG. 1A). In this process, the extruded shape 2 is plastically deformed and the receiving element 4 is reduced in size in the pressing direction P. In this way, the heating element 3 is put under an initial tension by the extruded shape 2, as a result of which the heating element 3, built up in a package-like way of insulating element 7, electrode bodies 6 and PTC element 5, is pressed together. As a result of the initial tension, possible clefts or gaps between PTC element 5, electrode bodies 6, insulating element 7 or extruded shape 2, which would obstruct with the heat transfer, are permanently pressed away.

The extruded shape 2 forms a heating surface 10, with which an additional heating function can be executed. For example, a plate (not shown) made of a thermally conductive material can be adjacent to the heating surface 10, with it being possible to warm said plate as a hot plate. The extruded shape of the heating module 1 according to the embodiment shown by way of example in FIG. 1 consists of an aluminum extruded shape. The extruded shape 2 is executed with reinforcement below the heating surface 10, which in some embodiments is essentially level, in order to prevent distortion of the heating surface 10 during the pressing of the heating element 3. As a result of the high surface quality of the aluminum extruded shape, a surface of the heating surface 10 can remain unprocessed, and nevertheless guarantee good heat transfer. In one embodiment, for enhanced heat flow within the heating module 1 shown in FIGS. 1 to 3 and 5 to 7, the heating surface 10 and a heat-emitting surface W of the heating element 3 are essentially equally sized.

As a result of good heat transfer and a large degree of heat removal, a large heating capacity can be discharged by the at least one PTC element 5, without the PTC element 5 being strongly heated itself and, as a result, reaching its temperature limit before the desired heating capacity is generated.

Opposite the heating surface 10, the extruded shape 2 forms in particular two conduit-shaped tube-receiving elements 11 in the first embodiment shown in FIGS. 1 to 3 and 5 by way of example.

A tube 12 is inserted into the tube-receiving elements 11 for allowing the flow of a fluid. This has the advantage that it is not necessary to take note of the leak tightness and pressure resistance of the conduit during the design of the extruded shape. The tube 12 is bent outside of the extruded shape 2 by an angle having a magnitude of roughly 180 degrees, for example in the shape similar to a shape of a hairpin. In this way, the one tube 12 can be mounted in both tube-receiving elements 11.

During operation, a liquid medium, for example, water, which is heated by the heating module 1, is conducted through the tubes 12. The fluid flows through the tubes 12 in a main direction of flow H. In order to guarantee uniform heating and flow of the fluid within the tube 12, the tube 12 can be executed with an essentially circular cross-section. The essentially circular cross-section offers limited flow resistance and leads to a uniform flow, in which the fluid is essentially uniformly heated.

An outer diameter or outer contour of the tube 12 essentially corresponds to an inner diameter or receiving contour of the tube-receiving element 11. This avoids the formation of a larger air gap between the tube 12 and the tube-receiving elements 11, which would represent an obstacle to the heat flow. In order to attach the tube 12 in the conduit-shaped tube-receiving elements 11 particularly in the embodiment of FIGS. 1 to 3 and 5, and in order to counter further poor heat flow, e.g., as a result of the formation of small gaps, the tube 12 is pressed in the extruded shape 2.

In order to facilitate the pressing, particularly in the embodiment shown in FIGS. 1 to 3 and 5, each of the conduit-shaped tube-receiving elements 11 has U-shaped pressing beads 13, typically positioned at a side when viewing a cross-section of the tube-receiving elements 11. The pressing beads 13 are arranged in a manner similar to the pressing beads 9 described above. In the course of the pressing of the tube 12, the pressing beads 13 are pressed together with a pressing tool (not shown), for example pliers, that engages from above and below in a pressing direction P. In this way, the smaller air gaps, which would obstruct the heat flow between the extruded shape 2 and the tube 12, are pressed away and the tube 12 is attached in the extruded shape 2 in such a way that it is secured against twisting and displacement. Alternatively, the tube 12 can also be glued or soldered into the conduits 11. As an example, an adhesive that is thermally conductive after hardening can be used for this.

In the case of the heating module 1 shown in FIGS. 1 to 3 and 5 to 7 by way of example, the heating element 3 is arranged between the heating surface 10 and the two tube-receiving elements 11. In this way, good heat flow is guaranteed both to the heating surface 10 and to the conduits 11.

Ends 14 of the tube 12 in FIGS. 1 to 3 and 5 to 7 that protrude on a front face of the extruded shape serve as a means of connection for the feed and offtake lines (not shown) of the fluid medium that is heated by the heating module 1. Alternatively, the ends 14 of the tube 12 can also be arranged as a part of a plug-and-socket connection for easy attachment of the feed and offtake lines. In the embodiments shown in FIGS. 1 to 3 and 5 to 7 by way of example, the feed and offtake lines are slid on to the tube ends 14. The feed and offtake lines are attached to the tube ends 14 with a means of attachment, e.g., a pipe clamp. Alternatively, the feed and offtake lines, which, for example, are formed of an elastic, hose-shaped material, can be held by an elastic widening around the tube ends 14.

With the heating module 1 according to the embodiment shown in FIGS. 1 to 3 and 5 to 7 by way of example, the fluid that is conducted through the tube 12 can be heated with a heating capacity of roughly 600 W.

Figure 4:
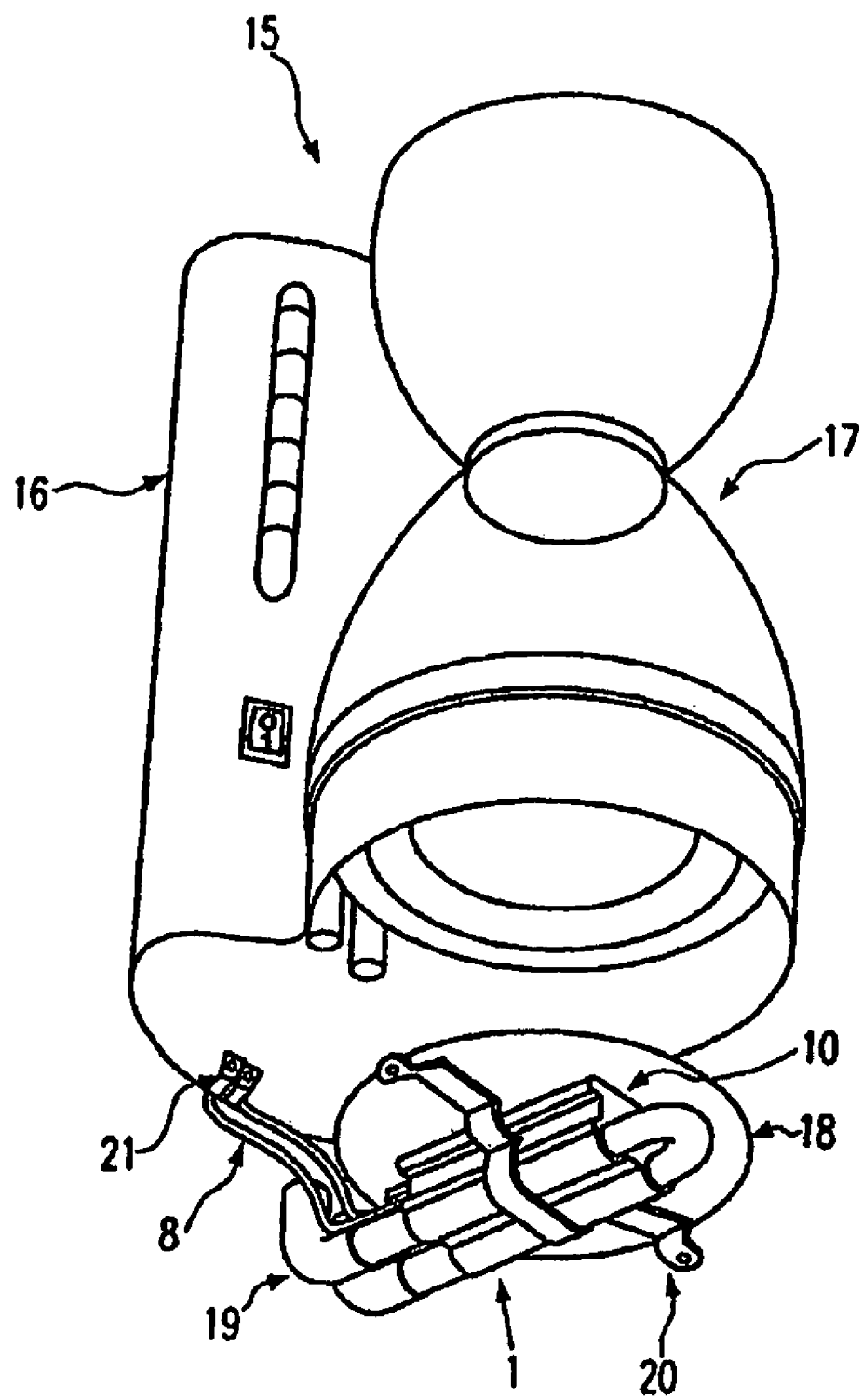
FIG. 4 illustrates an embodiment of a household appliance according to one embodiment, in particular, a coffee machine, schematically in a perspective view.

FIG. 4 shows another exemplary embodiment including an electrical appliance, which is formed in particular as a coffee machine 15. The coffee machine 15 has a liquid supply 16, a liquid reservoir 17, a heating surface 18, a line 19 and a heating module 1. During operation, a cold liquid, e.g., water, flows out of the liquid supply 16 to the heating module 1 via the line 19. The liquid is heated as it flows through the heating module 1. The liquid heated by the heating module 1 flows from the heating module 1 to the warm liquid reservoir 17 via the line 19. The heating surface 18 forms a hot plate, which is arranged under the warm liquid reservoir 17, said hot plate 18 keeping the liquid in the warm liquid reservoir 17 warm. The heating module 1 is mounted below the hot plate 18 with a spring element 20. A heating surface 10 of the heating module 1 is pressed against the hot plate 18, and it emits thermal energy itself. The heating module 1 is connected to a voltage source via contact lines 8. The contact lines 8 can be executed with connecting elements 21, e.g., a standard plug, for simple connection to the voltage source. Instead of the liquid supply 16 shown by way of example in FIG. 4, the line 19 of the coffee machine 15 can also be connected directly to a liquid supply (not shown), e.g., a water supply line.

In the case of the electrical appliance 15 shown by way of example in FIG. 4, the heating module 1 assumes both the function of the heating of a liquid flowing through and also the function of the thermal energy supply of the hot plate 18. As a result, the heat capacity to be generated by the heating module 1 varies greatly, and is roughly 600 W when the liquid is being heated and roughly 60 W when heating the hot plate 18. By using one of the embodiments of the heating module 1 from FIGS. 1 to 3 and 5 to 7, it is advantageously possible to do without a temperature controller in the coffee machine 15 according to the invention.

FIG. 5 shows an exploded representation of one embodiment of the heating module 1 from FIGS. 1 to 3. Using FIG. 5, the following describes a method of manufacturing this embodiment of the heating module 1 according to one embodiment.

The extruded shape 2 shown in FIG. 5 by way of example is manufactured with three conduit-shaped hollow spaces 4', 11' in particular. The heating element 3 is inserted into the hollow space 4'. The heating element 3 is pre-mounted before insertion into the extruded shape 2 by means of the formation of a stack comprising the at least one PTC element 5, two electrode bodies 6 and one insulation element 7. After insertion, the heating element 3 is pressed in the hollow space 4'. For this, a suitable tool, e.g., pliers, presses the extruded shape 2 together in the pre-weakened area of a pressing bead 9 in a pressing direction P (FIG. 1A). The air gap $P_2$ of the pressing bead 9 is reduced in size in this way. The plastic deformation of the pre-weakened extruded shape 2 in the area of the pressing beads 9 is continued until the heating element 3 is pressed in the hollow space 4'.

The tube 12 is bent into a U-shaped form before assembly of the embodiment of the heating module shown in FIG. 5. Two side pieces of the U-shaped tube 12 are inserted into the two other hollow spaces 11' of the extruded shape 2, said hollow spaces 11' being equipped as tube-receiving elements 11. In this case, the length $L_1$ of the tube 12 is larger than the length $L_2$ of the extruded shape 2, as a result of which the tube ends 14 of the tube 12 stand out from the extruded shape 2 after insertion, consequently forming a means of connection for the feed line and offtake line of the fluid. After the insertion of the tube 12 into the tube-receiving elements 11, the tube 12 is pressed in the extruded shape 2. For this purpose, the upper pressing beads 13 are pressed together with a suitable tool, e.g., pliers, in a pressing direction P from both sides. In this connection, the air gap $P_1$ of the pressing beads 13 is reduced in size. The plastic deformation of the pre-weakened area of the pressing beads 13 is continued until the tube body 12 is pressed in the extruded shape 2.

The heating element 3 and the tubes 12 can also be pressed in the extruded shape in one operational step. In this process, the various pressing beads 9, 13 are pressed together in the pressing direction P.

FIGS. 6 and 7 show a heating module 1 according to another embodiment. In the following, only the differences to the embodiment shown in FIGS. 1 to 3 and 5 are described.

Two tube-receiving elements 11 of the embodiment shown in FIGS. 6 and 7 are not formed as a conduit that encloses the tube 12 in its circumferential direction, as is the case with the embodiment of FIGS. 1 to 3 and 5, but rather as a semi-circular groove on the outside of the extruded shape 2. The tube 12, which is formed as in the above-described embodiment of FIGS. 1 to 3 and 5, is mounted in the semi-circular receiving element 11.

Because of the semi-circular receiving element 11, the extruded shape 2 encloses roughly half of the tube 12, as a result of which good heat flow is guaranteed from the extruded shape to the tube 12. Furthermore, the tube 12 can be particularly easily inserted into the receiving element 11 in a mounting direction M (FIG. 6C) as a result of the semi-circular and groove-shaped development of the receiving element 11. The receiving contour of the tube-receiving element 11 which touches the tube 12 when mounted, essentially corresponds to the outer contour of the tube 12, in order to avoid contact gaps and to form the heat transferring contact surface maximally.

In order to attach the tube 12 in the receiving element 11, the tube 12 is, for example, glued, soldered or welded in the receiving element 11. The adhesive used or the solder used are both heat-resistant and also optimally thermally conductive. The tube 12 is connected to the receiving element 11 in a firm bond by the adhesive or solder, and possible heat-insulating gaps between the tube 12 and the receiving element 11 are closed by the adhesive or solder.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A heating module for integrating into an electrical appliance or in a laboratory apparatus, the heating module comprising:
    a body having at least one heating surface and an extruded shape, the extruded shape defining at least one tube-receiving element that extends through the entire extruded shape;
    at least one heating element that comprises at least one PTC element and is fixed in the body; and
    a tube through which a fluid can flow, said tube being arranged so that said tube is at least partially circumferentially surrounded by and partially enclosed in the tube-receiving element or said tube being configured to be pressed in the tube-receiving element.

2. The heating module according to claim 1 wherein a receiving contour of the tube-receiving element essentially corresponds, at least in sections, to an outer contour of the tube.

3. The heating module according to claim 1 wherein the tube-receiving element encloses at least half of a circumference of the tube.

4. The heating module according to claim 3 wherein the tube-receiving element is formed as a conduit that substantially encloses and circumferentially surrounds at least a portion of a length of the tube.

5. The heating module according to claim 1 wherein the at least one tube-receiving element has at least one pressing bead that includes an essentially U-shaped cross-section.

6. The heating module according to claim 1 wherein the heating module has two tube-receiving elements that are essentially parallel to each other.

7. The heating module according to claim 1 wherein the tube is connected to the tube-receiving element in a firm bond.

8. The heating module according to claim 1 wherein the extruded shape has a hollow space, the heating element is pressed in the hollow space.

9. The heating module according to claim 1 wherein the extruded shape has a pressing bead that includes an essentially U-shaped cross-section, the pressing bead is positioned adjacent at least one side of the receiving element.

10. The heating module according to claim 1 wherein the extruded shape has a hollow space, the heating element is cast into the hollow space.

11. The heating module according to claim 1 wherein a heat emission surface of the heating element and the heating surface formed by the extruded shape are essentially of equal size.

12. The heating module according to claim 1 wherein the at least one tube-receiving element, the at least one heating surface and the heating element form a stack in a direction essentially perpendicular to the heating surface.

13. The heating module according to claim 1 wherein the tube is longer than the tube-receiving element.

14. The heating module according to claim 1 wherein the tube has an inlet side and an outlet side and that the inlet side and the outlet side are arranged on the same side of the heating module.

15. The heating module according to claim 1 wherein the heating element comprises two electrode bodies, the at least one PTC element is arranged in between the two electrode bodies, the two electrode bodies and the at least one PTC element form a stack.

16. A heating module for integrating into an electrical appliance or in a laboratory apparatus, the heating module comprising:
a body having at least one heating surface and an extruded shape, the extruded shape defining at least one tube-receiving element that extends through the entire extruded shape;
at least one heating element being fixed in the body and comprising at least one PTC element and two electrode bodies, the two electrode bodies and the at least one PTC element form a stack, wherein each of the electrode bodies has a contact element configured to couple the electrode bodies to a power source; and
a tube through which a fluid can flow, said tube being at least partially circumferentially surrounded by and partially enclosed in the tube-receiving element or said tube being configured to be pressed in the tube-receiving element.

17. A heating module for integrating into an electrical appliance or in a laboratory apparatus, the heating module comprising:
a body having at least one heating surface and an extruded shape, the extruded shape defining at least one tube-receiving element that extends through the entire extruded shape;
at least one heating element being fixed in the body and comprising at least one PTC element and two electrode bodies, the two electrode bodies and the at least one PTC element form a stack, the at least one PTC element positioned between the two electrode bodies, wherein wires for electrical contacting are soldered in the heating element on the at least one PTC element; and
a tube through which a fluid can flow, said tube being at least partially circumferentially surrounded by and partially enclosed in the tube-receiving element or said tube being configured to be pressed in the tube-receiving element.

18. The heating module according to claim 17 wherein the wires configured to be connected to a power source.

19. The heating module according to claim 17 wherein the heating element comprises at least one insulating element, the at least one insulating element, encloses the stack made of the at least one PTC element and the two electrode bodies or the soldered-on wires in an electrically insulating manner.

20. The heating module according to claim 1 wherein the heating element is electrically insulated from the extruded shape by an insulating element.

21. The heating module according to claim 20 wherein the insulating element comprises a heat-conducting plastic foil.

22. The heating module of claim 21, wherein the heat-conducting plastic foil is a polyimide foil.

23. The heating module of claim 1, wherein the tube is insertable through the tube-receiving element due to the extruded shape.

24. The heating module according to claim 1 wherein the body has a pair of grooves that define the tube-receiving element.

* * * * *

UNITED STATES PATENT AND TRADEMARK OFFICE
CERTIFICATE OF CORRECTION

PATENT NO.           : 7,865,073 B2
APPLICATION NO.      : 10/578307
DATED                : January 4, 2011
INVENTOR(S)          : Friedrich Von Der Lühe et al.

It is certified that error appears in the above-identified patent and that said Letters Patent is hereby corrected as shown below:

Title Page Item 75:
"Friedrich Von Der Lühe, Discovery Bay (HK); William Muirhead, Chaiwan (HK)" should read, --Friedrich Von Der Lühe, Discovery Bay City, Lantau Island (HK); William Muirhead, Chaiwan (HK)--.

Column 12, Line 16:
"wires for electrical contacting are soldered in the heating" should read, --wires for electrical contact are soldered in the heating--.

Signed and Sealed this
Fifth Day of July, 2011

David J. Kappos
*Director of the United States Patent and Trademark Office*